US012679139B2

(12) United States Patent
Chang et al.

(10) Patent No.: US 12,679,139 B2
(45) Date of Patent: Jul. 14, 2026

(54) ADJUSTABLE FREEWHEEL HUB ASSEMBLY

(71) Applicant: G. FALCON CYCLE-PARTS CO., LTD, Taichung City (TW)

(72) Inventors: Wei-Yueh Chang, Taichung City (TW); Ryan Eugene Liles, Taichung City (TW)

(73) Assignee: G. FALCON CYCLE-PARTS CO., LTD, Taichung City (TW)

( * ) Notice: Subject to any disclaimer, the term of this patent is extended or adjusted under 35 U.S.C. 154(b) by 243 days.

(21) Appl. No.: 18/743,177

(22) Filed: Jun. 14, 2024

(65) Prior Publication Data

US 2025/0381797 A1     Dec. 18, 2025

(51) Int. Cl.
B60B 27/04      (2006.01)
B60B 27/00      (2006.01)
F16D 41/30      (2006.01)

(52) U.S. Cl.
CPC ........ B60B 27/047 (2013.01); B60B 27/0057 (2013.01); *F16D 41/30* (2013.01)

(58) Field of Classification Search
CPC .... B60B 27/0057; B60B 27/047; F16D 41/30
See application file for complete search history.

(56) References Cited

U.S. PATENT DOCUMENTS

| | | | | | |
|---|---|---|---|---|---|
| 5,938,560 | A | * | 8/1999 | Steuer | B62M 11/16 |
| | | | | | 192/217.4 |
| 7,726,454 | B2 | * | 6/2010 | French | B62M 11/02 |
| | | | | | 192/37 |
| 2005/0183920 | A1 | * | 8/2005 | Hou | F16D 41/30 |
| | | | | | 192/64 |
| 2012/0318632 | A1 | * | 12/2012 | Blake | F16D 41/24 |
| | | | | | 192/41 R |
| 2025/0121630 | A1 | * | 4/2025 | Chang | F16D 41/24 |
| 2025/0282175 | A1 | * | 9/2025 | Chang | B60B 27/0047 |

* cited by examiner

*Primary Examiner* — Adam D Rogers
(74) *Attorney, Agent, or Firm* — WPAT, PC

(57)          ABSTRACT

An adjustable freewheel hub assembly has a hub component, a coaster brake mechanism, and an adjusting switch. The hub component has an axle, a hub shell, a helix hub driver, and a sprocket. The helix hub driver has a pawl groove and a first engaging notch formed on its periphery. The sprocket is sheathed onto the helix hub driver, is hollow, and has a ratchet teeth construction formed on an inner wall of the sprocket and a second engaging notch. The coaster brake mechanism is disposed in the hub shell and is drivable by the helix hub driver. By the adjusting switch engaged in or detached from the first engaging notch and the second engaging notch, the freewheel hub assembly can be adjusted between a fixed-gear mode and a single-speed mode to have different functions.

12 Claims, 9 Drawing Sheets

ADJUSTABLE FREEWHEEL HUB ASSEMBLY

BACKGROUND OF THE INVENTION

1. Field of the Invention

The present invention relates to a bicycle component, and particularly to an adjustable freewheel hub assembly.

2. Description of Related Art

A bicycle is a two-wheeled land vehicle. After getting on the bicycle, a rider pedals to drive the bicycle by manpower; hence, the bicycle is an environmentally-friendly vehicle. The bicycle industry is a conventional industry and has been developing for more than a hundred years. The focus of the bicycle industry is transferred from general transportation to various functions such as sport bikes, mountain bikes, and city bikes. The bicycle also has different types such as a coaster brake bike, a fixed-gear bike, and a single speed bike. The coaster brake bike can be braked by pedaling reversely for half of a cycle. In the fixed-gear bike, the rear wheel and pedals always spin together, and by pedaling reversely, the fixed-gear bike may move backward when the fixed-gear bike is first stationary. The single speed bike can only move forward, and the rear wheel does not rotate during reverse pedaling.

However, different types of the bicycles mentioned above perform their functions with different freewheel hub assemblies, and the freewheel hub assembly on each bike is inconvenient for detachment and replacement. To satisfy demand for different functions, the rider can only buy different types of bicycles, which causes high purchasing cost. In addition, in a conventional coaster brake bike, a sprocket has an inner shell between its outer shell and a helix hub driver, which causes the sprocket to have a larger diameter. Hence, a gear ratio of the chainring to the sprocket is smaller, and thus the bike is slower on the flat.

To overcome the shortcomings of the conventional freewheel hub assembly, the present invention provides an adjustable freewheel hub assembly to mitigate or obviate the aforementioned problems.

SUMMARY OF THE INVENTION

The main objective of the present invention is to provide an adjustable freewheel hub assembly that is adjustable between different functions and allows the sprocket to be designed smaller to increase a gear ratio of the chainring to the sprocket.

The adjustable freewheel hub assembly has a hub component, a coaster brake mechanism, and at least one adjusting switch. The hub component has an axle, a hub shell, a helix hub driver, a brake arm, and a sprocket. The hub shell surrounds the axle. The helix hub driver is disposed on an end of the hub shell, is sheathed onto the axle, and has at least one pawl groove and at least one first engaging notch formed on its periphery. The brake arm is disposed on the other end of the hub shell. The sprocket is sheathed onto the helix hub driver, is hollow, and has a ratchet teeth construction formed on an inner wall of the sprocket and at least one second engaging notch. The coaster brake mechanism is disposed in the hub shell and between the helix hub driver and the brake arm, is sheathed onto the axle, and is drivable by the helix hub driver to abut against an inner wall of the hub shell. The at least one adjusting switch is detachably engaged in the at least one first engaging notch and the at least one second engaging notch such that the helix hub driver and the sprocket rotate synchronously.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
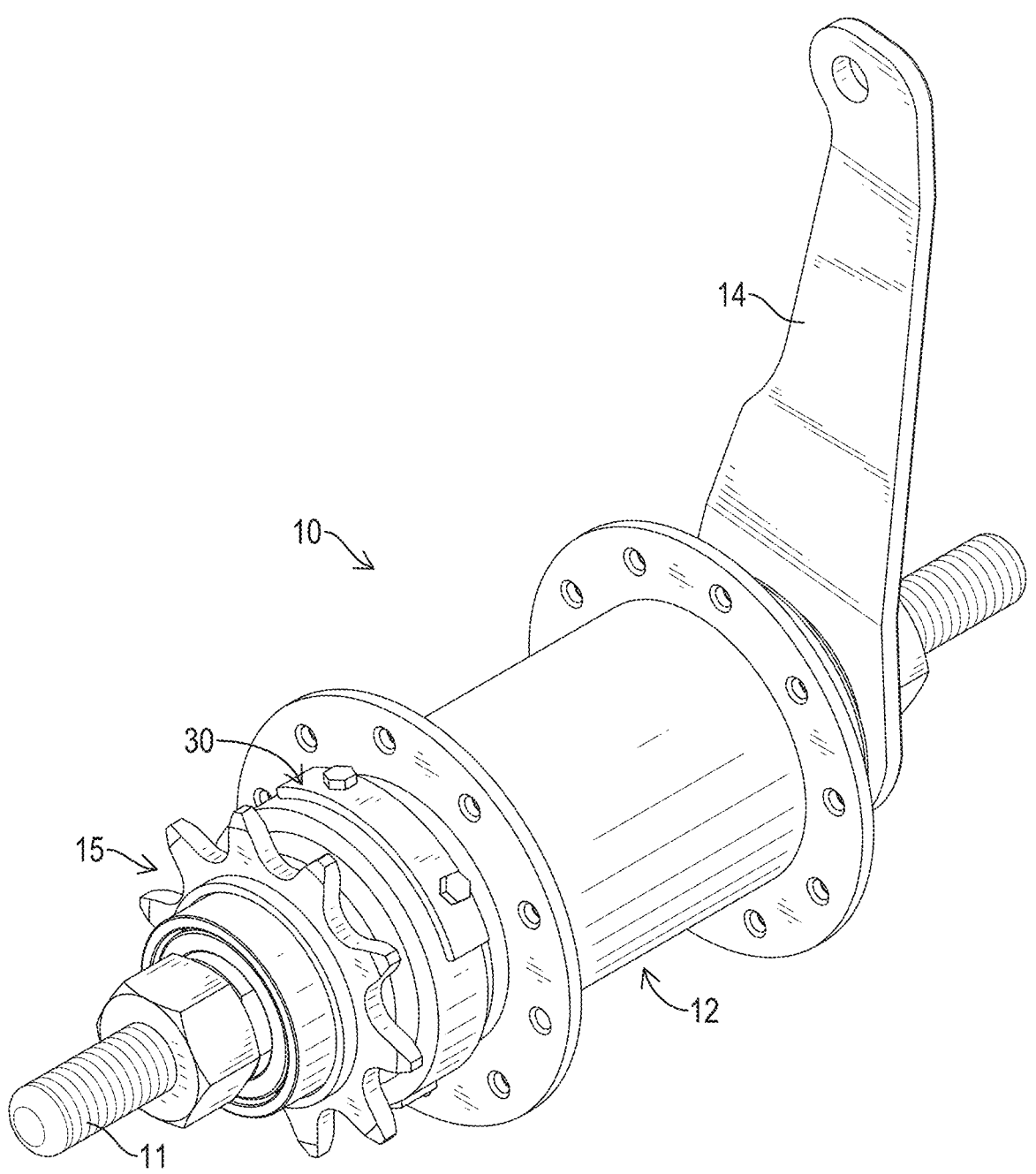
FIG. 1 is a perspective view of a first preferred embodiment of an adjustable freewheel hub assembly in accordance with the present invention.
Figure 2:
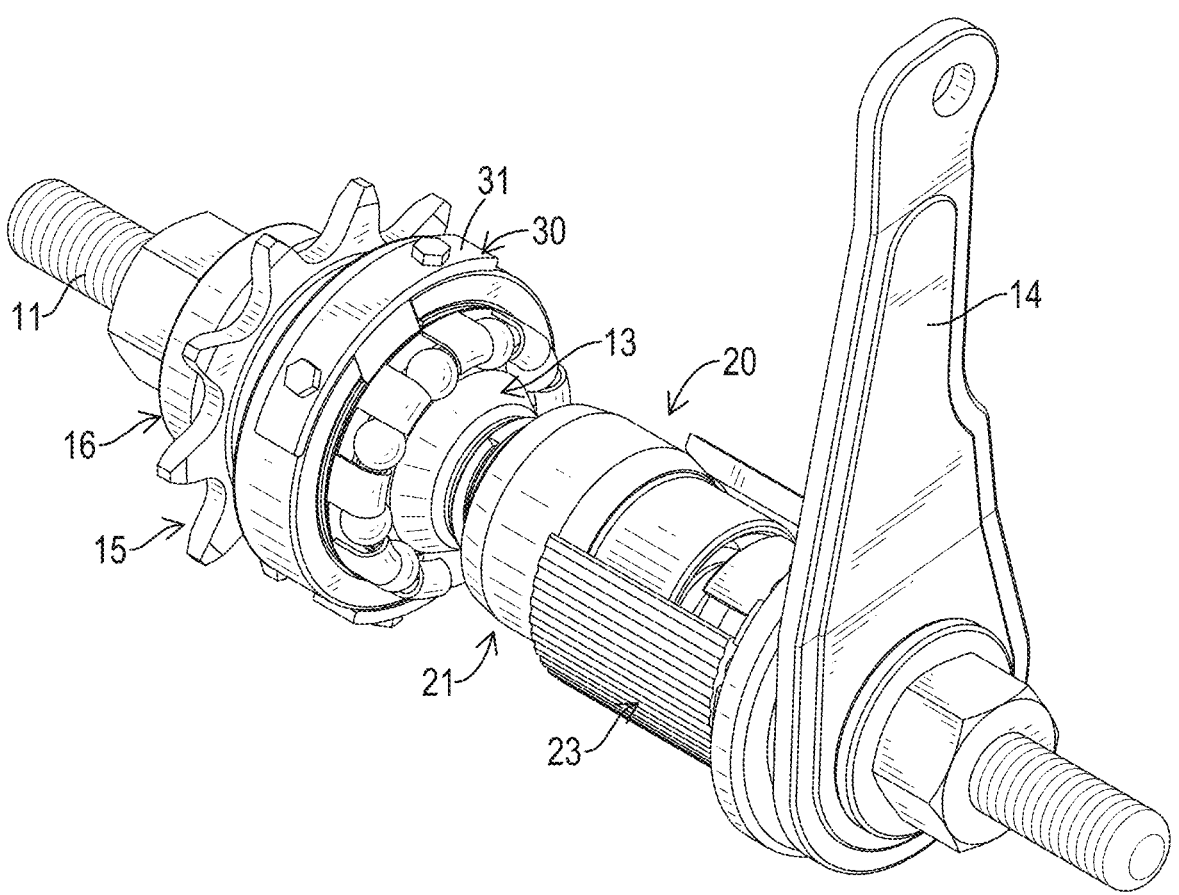
FIG. 2 is a perspective view of the adjustable freewheel hub assembly in FIG. 1 omitting a hub shell.

With reference to FIGS. 1 and 2, a first preferred embodiment of an adjustable freewheel hub assembly in accordance with the present invention has a hub component 10, a coaster brake mechanism 20, and two adjusting switches 30. The coaster brake mechanism 20 is disposed inside the hub component 10. The two adjusting switches 30 are configured to be disposed to the hub component 10 for adjusting and switching functions of the hub component 10.

Figure 3:
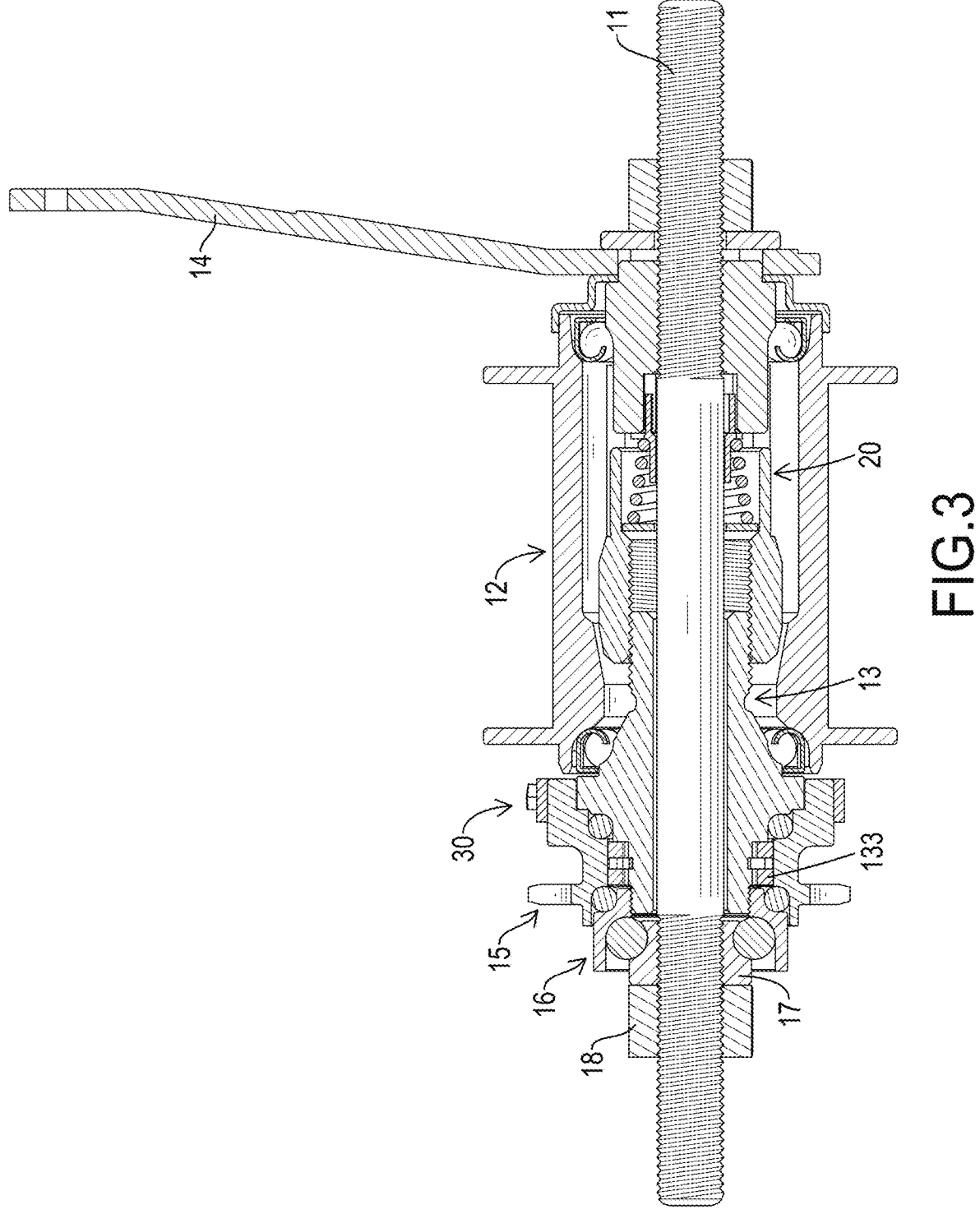
FIG. 3 is a side view in partial section of the adjustable freewheel hub assembly in FIG. 1.
Figure 4:
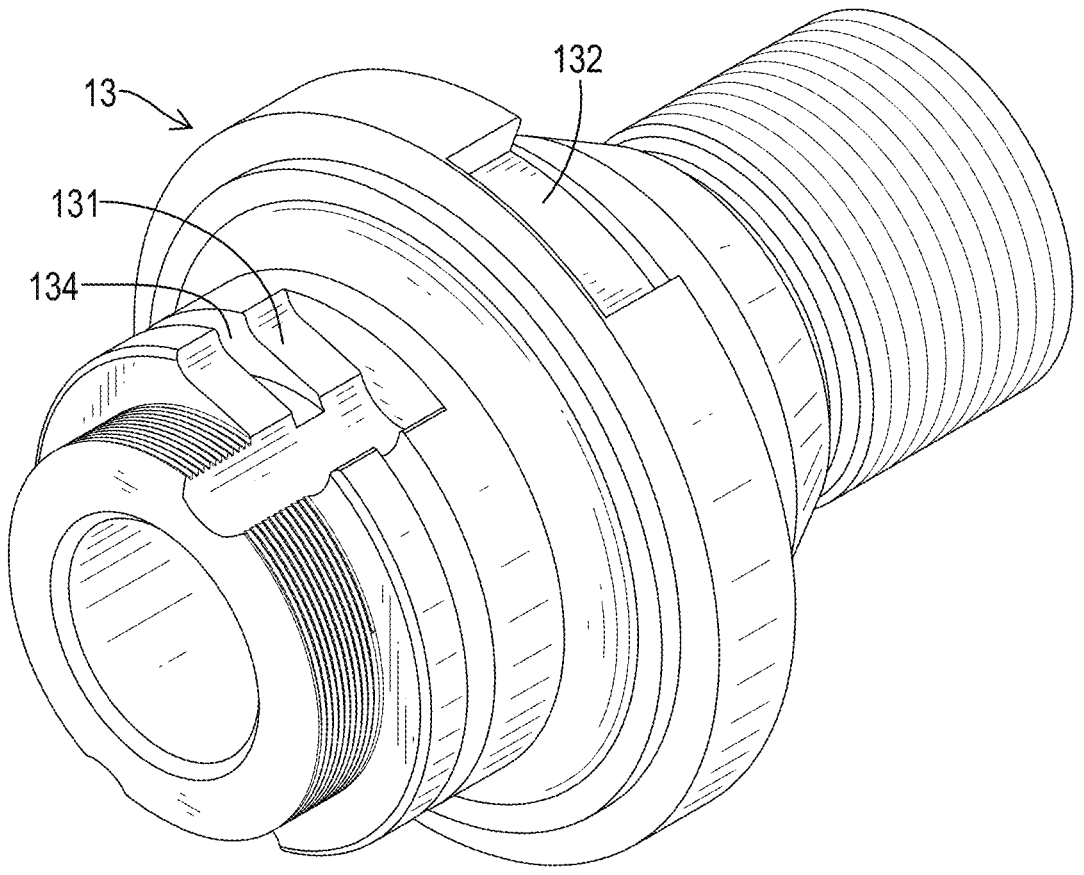
FIG. 4 is a perspective view of a helix hub driver of the adjustable freewheel hub assembly in FIG. 1.
Figure 5:
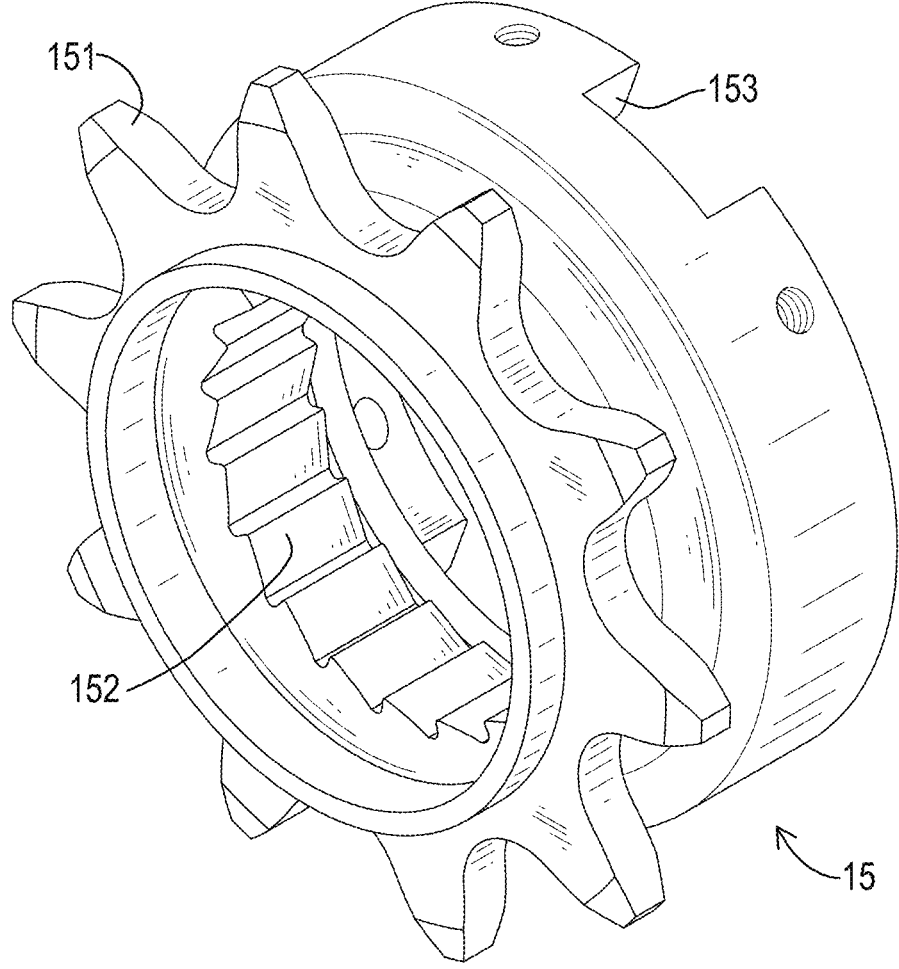
FIG. 5 is a perspective view of a sprocket of the adjustable freewheel hub assembly in FIG. 1.

With reference to FIGS. 1 to 3, the hub component 10 has an axle 11, a hub shell 12, a helix hub driver 13, a brake arm 14, and a sprocket 15. The axle 11 is the axis of the adjustable freewheel hub assembly. The hub shell 12 surrounds the axle 11 and is hollow to form a space between the hub shell 12 and the axle 11 for containing the coaster brake mechanism 20 or other components therein. The helix hub driver 13 is disposed on one of two opposite ends of the hub shell 12, and the brake arm 14 is disposed on the other one of two opposite ends of the hub shell 12. The helix hub driver 13 is sheathed onto the axle 11 and extends into the hub shell 12 to be connected to the coaster brake mechanism 20 for driving the coaster brake mechanism 20. The sprocket is sheathed onto the helix hub driver 13, wherein the sprocket 15 and the helix hub driver 13 are in linkage via a ratchet mechanism.

Specifically, with reference to FIGS. 4 to 6 and 8, the helix hub driver 13 has two pawl grooves 131 and two first engaging notches 132. The sprocket 15 is hollow and has multiple sprocket teeth 151, a ratchet teeth construction 152, and two second engaging notches 153. The multiple sprocket teeth 151 are arranged radially. The ratchet teeth construction 152 is formed on an inner wall of the sprocket 15, and the two second engaging notches 153 are defined through the sprocket 15.

Figure 6:
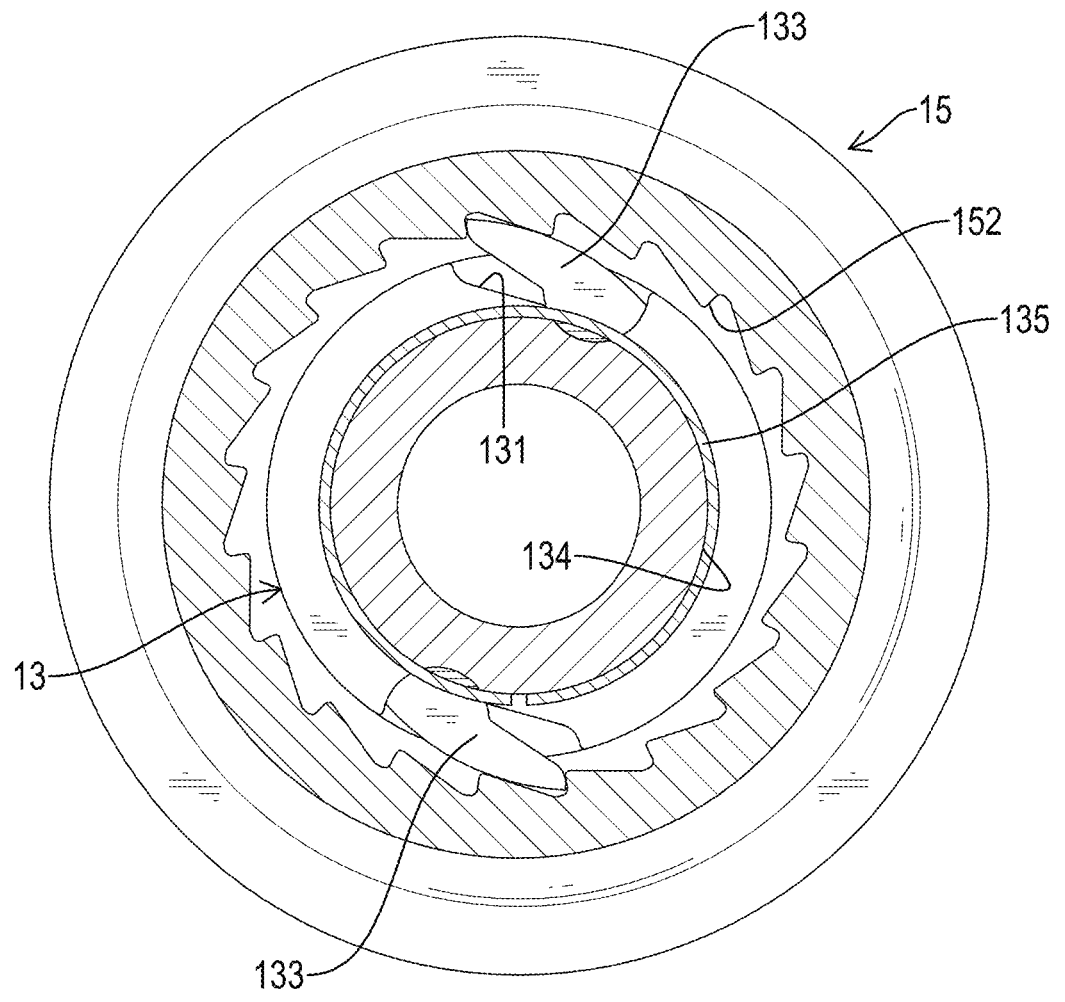
FIG. 6 is a sectional view of the helix hub driver and the sprocket of the adjustable freewheel hub assembly in FIG. 1 assembled together.
Figure 8:
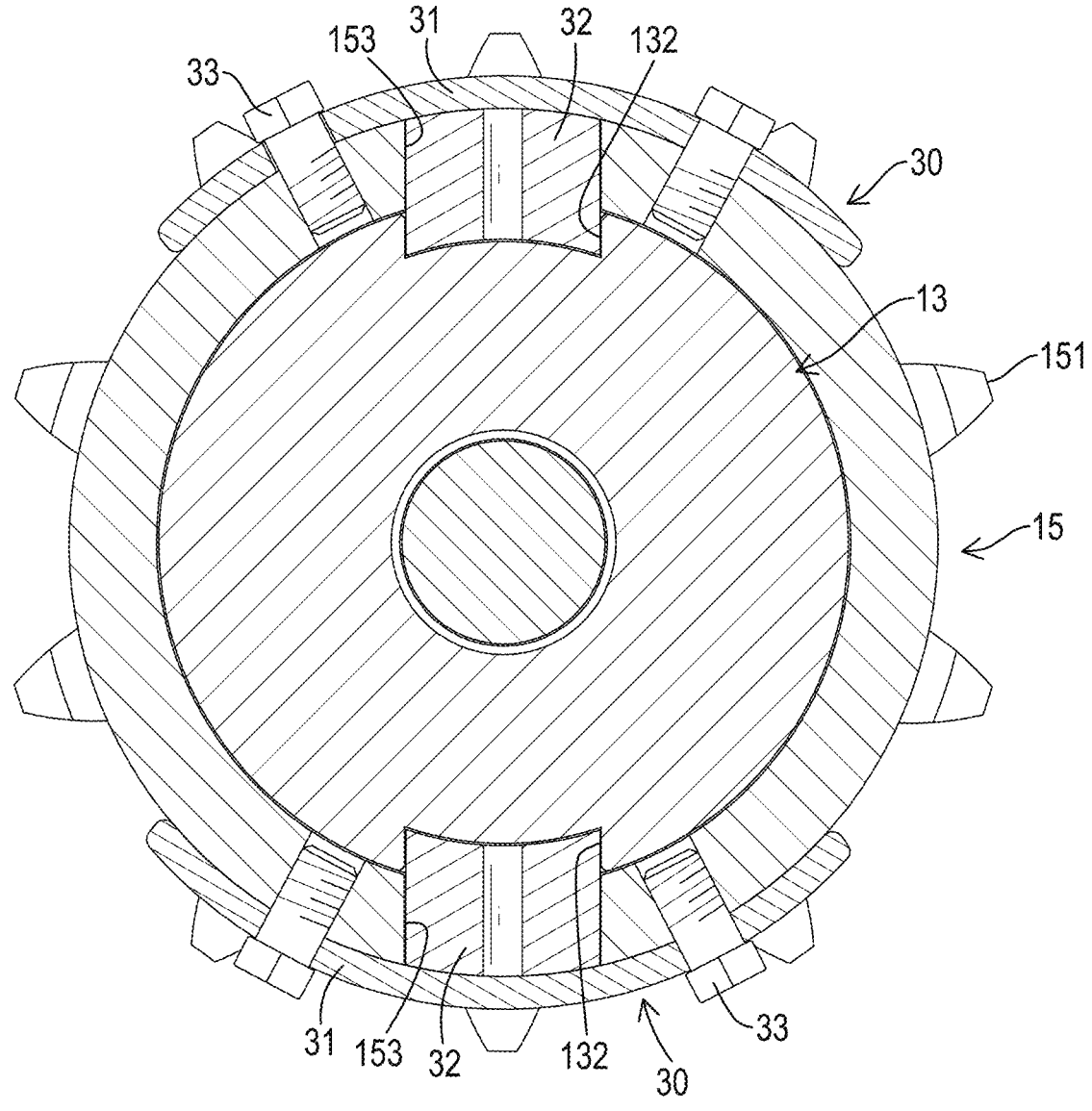
FIG. 8 is a sectional view of an adjusting switch of the adjustable freewheel hub assembly in FIG. 1.

With reference to FIG. 6, each one of the two pawl grooves 131 may contain a pawl 133 therein to match the ratchet teeth construction 152 of the sprocket 15 so as to form the ratchet mechanism between the sprocket 15 and the helix hub driver 13. When a rider pedals, the sprocket 15 rotates via transmission of a chainring and a chain, and the sprocket 15 may drive the helix hub driver 13 to rotate via the ratchet mechanism mentioned above. With reference to FIG. 8, each one of the two second engaging notches 153 is aligned with and communicates with a respective one of the two first engaging notches 132 so as to match a respective one of the two adjusting switches 30.

More specifically, in the first preferred embodiment, the helix hub driver 13 further has an annular ditch 134 and a limiting ring 135. The annular ditch 134 is annularly recessed on a periphery of the helix hub driver 13 and passes through the two pawl grooves 131. The limiting ring 135 is disposed in the annular ditch 134 and abuts against the pawl 133 in each one of the two pawl grooves 131, which allows said pawl 133 to be positioned in the corresponding pawl groove 131 and prevents said pawl 133 from falling off.

With reference to FIGS. 2 and 3, further, in the first preferred embodiment, the hub component 10 has a ball bearing 16. The ball bearing 16 is disposed on a side of the sprocket 15 for smooth rotation of the sprocket 15. Specifically, the ball bearing 16 is sheathed onto the helix hub driver 13 and engaged with an inner side of the sprocket 15 being hollow, which allows the configuration of the hub component 10 to be tighter. Additionally, the hub component 10 may have other bearings respectively disposed between the helix hub driver 13 and the hub shell 12 and between a brake cone 22 of the coaster brake mechanism 20 and the hub shell 12 for smooth rotation.

With reference to FIG. 3, furthermore, in the first preferred embodiment, the hub component 10 has a dust cap 17 and a locknut 18. The dust cap 17 is disposed on the axle 11, disposed aside the ball bearing 16, and configured to cover gaps between the ball bearing 16 and the axle 11 and prevent dust from entering the ball bearing 16 or the sprocket 15. The locknut 18 is screwed with the axle 11 and disposed aside the dust cap 17 so as to position the ball bearing 16 and the dust cap 17 on the axle 11 and prevent the ball bearing 16 and the dust cap 17 from moving along the axle 11.

Besides, the hub component 10 has another locknut screwed with the axle 11 and disposed aside the brake arm 14 for positioning. Preferably, each one of the locknuts of the hub component 10 may adopt a hydraulic nut which takes up little space, has a high level of accuracy, and allows other components of the hub component 10 to be stably mounted on the axle 11.

Figure 7:
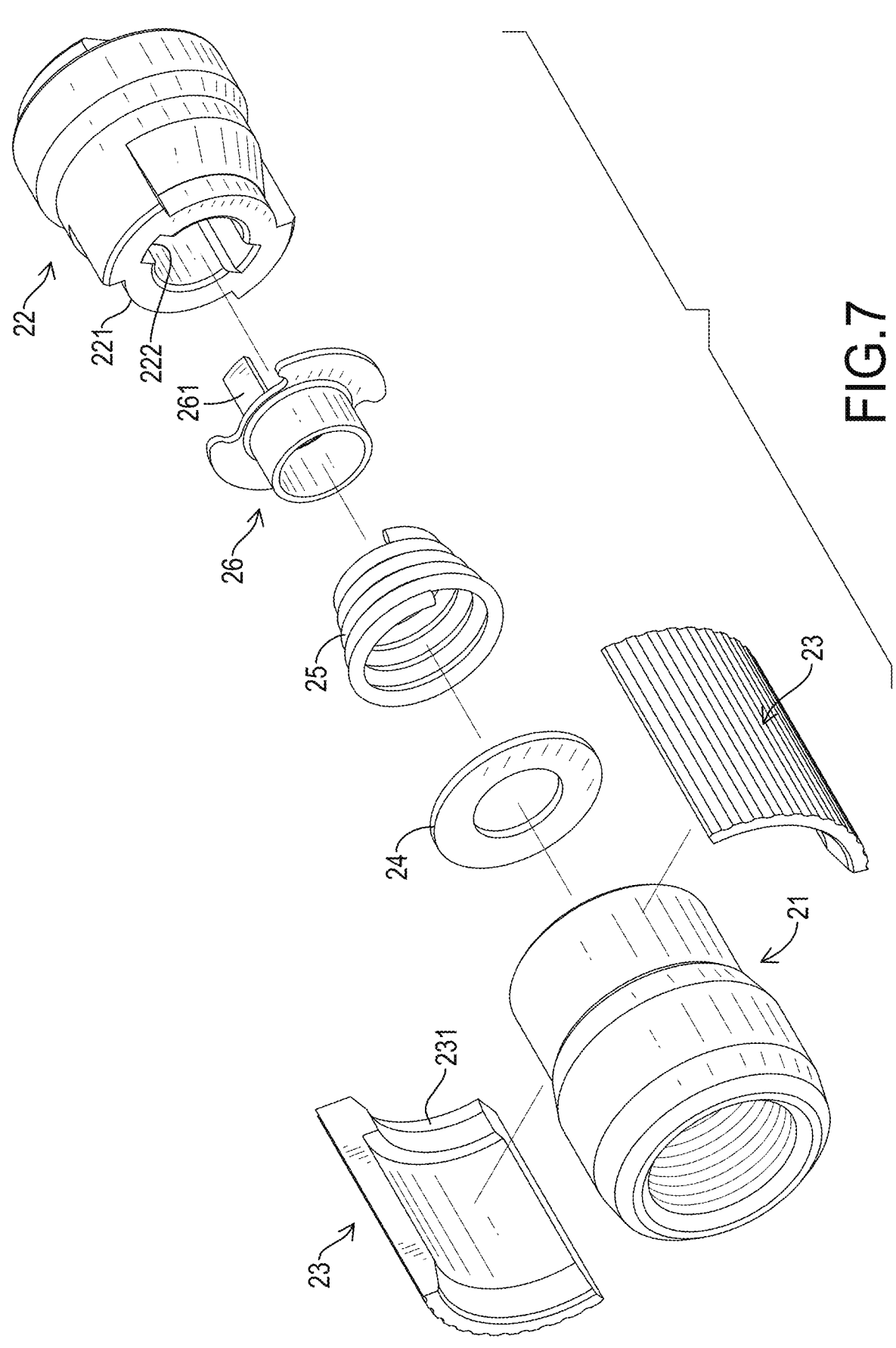
FIG. 7 is an exploded view of a coaster brake mechanism of the adjustable freewheel hub assembly in FIG. 1.

With reference to FIGS. 2, 3, and 7, the coaster brake mechanism 20 is disposed inside the hub shell 12 and is drivable by the helix hub driver 13 to abut against an inner wall of the hub shell 12 such that a brake function can be achieved by friction between the coaster brake mechanism 20 and the hub shell 12. Specifically, with reference to FIG. 7, the coaster brake mechanism 20 has a clutch cone 21, a brake cone 22, and two brake shoes 23. The clutch cone 21 is screwed with the helix hub driver 13 and is configured to move relative to the axle 11. The brake cone 22 is fixed on (specifically screwed with) the axle 11. The two brake shoes 23 are attached on a periphery of the clutch cone 21 and a periphery of the brake cone 22 and are configured to be pushed by the clutch cone 21 to abut against the inner wall of the hub shell 12.

With reference to FIGS. 2, 3, and 8, the two adjusting switches 30 are disposed on a periphery of the sprocket 15. With reference to FIG. 8, each one of the two adjusting switches 30 is detachably engaged in a respective one of the two second engaging notches 153 and a respective one of the two first engaging notches 132. In the first preferred embodiment, each one of the two adjusting switches 30 has a fixing sheet 31 and an engaging block 32. The fixing sheet 31 is attached to the periphery of the sprocket 15 and has several through holes. Each through hole is configured for a bolt 33 to be mounted therethrough, and the bolt 33 is then screwed with the sprocket 15 to fix the fixing sheet 31 on the periphery of the sprocket 15. The engaging block 32 is configured to be engaged in the corresponding second engaging notch 153 and the corresponding first engaging notch 132 at the same time and limited by the fixing sheet 31.

In use, by said adjusting switch 30 engaged in the corresponding second engaging notch 153 and the corresponding first engaging notch 132, the helix hub driver 13 is configured to rotate synchronously with the sprocket 15, and thereby the adjustable freewheel hub assembly is adjusted to a fixed-gear mode. The fixed-gear mode means that the pedals always spin together with the rear wheel of a bicycle regardless that a rider pedals forward or reversely. During reverse pedaling, the helix hub driver 13 still rotates synchronously with the sprocket 15, and thereby the helix hub driver 13 is configured to drive the clutch cone 21 to push the two brake shoes 23 against the inner wall of the hub shell 12 for braking. Hence, the adjustable freewheel hub assembly may perform the function of a coaster brake.

More specifically, with reference to FIG. 7, the coaster brake mechanism 20 further has a tab 24, a compression spring 25, and a spring seat 26. The tab 24 is disposed inside the clutch cone 21. The spring seat 26 is disposed on an end of the clutch cone 21 near the brake cone 22, and the compression spring 25 is disposed between and abuts against the tab 24 and the spring seat 26. Further, the spring seat 26 has multiple insertions 261 formed on an end of the spring seat 26 facing the brake cone 22, and the brake cone 22 has multiple extending grooves 222 formed on an end of the brake cone 22 facing the clutch cone 21.

When the helix hub driver 13 drives the clutch cone 21 to rotate reversely during reverse pedaling, the clutch cone 21 pushes the spring seat 26 via transmission of the tab 24 and the compression spring 25 so as to allow the multiple insertions 261 to be respectively inserted into and limited by the multiple extending grooves 222. Thereby, the spring seat 26 is combined with the brake cone 22 to restrict the rotation of the clutch cone 21. At the same time, the two brake shoes 23 have been driven by the clutch cone 21 to abut against the inner wall of the hub shell 12 to perform the function of a coaster brake.

In addition, with reference to FIG. 7, the brake cone 22 has two positioning grooves 221 formed on its periphery, and each one of the two brake shoes 23 has a protrusion 231 formed on an end of said brake shoe 23 and configured to be located in and limited by a respective one of the two positioning grooves 221. Each one of the two positioning grooves 221 has an arc surface, and the corresponding protrusion 231 also has an arc surface matching that of said positioning groove 221. Therefore, said protrusion 231 is configured to be attached to the corresponding positioning groove 221, which limits positions of the two brake shoes 23 and narrows the gap between the two brake shoes 23 and the brake cone 22. Other detailed configurations of the coaster brake mechanism 20 and its function are conventional in the art of bicycle hub and are thus omitted from description herein. The coaster brake mechanism 20 may adopt configurations of other conventional coaster brakes, which are not limited to the first preferred embodiment.

By detaching said adjusting switch 30 engaged in the corresponding second engaging notch 153 and the corresponding first engaging notch 132, the sprocket 15 and the helix hub driver 13 are configured to rotate synchronously in only one direction via the above-mentioned ratchet mechanism, and hence the adjustable freewheel hub assembly is adjusted to a single-speed mode. The single-speed mode means that the pedals and the rear wheel of a bicycle spin together only when pedaling forward. When pedaling reversely to rotate the sprocket 15, the helix hub driver 13 stays stationary since the ratchet mechanism cannot transmit in the reverse direction. Therefore, the adjustable freewheel hub assembly cancels the function of the coaster brake mechanism 20.

The adjustable freewheel hub assembly in accordance with the present invention has an advanced design, has a tight configuration, and is convenient in use. By said adjusting switch 30 engaged in or detached from the corresponding first engaging hole 132 on the helix hub driver 13 and the corresponding second engaging hole 153 on the sprocket 15, the adjustable freewheel hub assembly can be adjusted to perform or not to perform the function of the coaster brake mechanism 20, which satisfies rider's demand for different functions of the bicycle and lowers the purchasing cost since there is no need to buy different types of bicycles. Moreover, the helix hub driver 13 has said pawl groove 131 formed thereon in one piece for containing said pawl 133. Thereby, the sprocket 15 may omit the design of an inner shell and can be designed with a smaller diameter to increase the gear ratio between the chainring to the sprocket 15 and increase the speed of the bicycle on the flat.

In the first preferred embodiment, the helix hub driver 13 and the sprocket 15 have two first engaging notches 132 and two second engaging notches 153 to match the two adjusting switches 30. In other embodiments, numbers of said adjusting switch 30, said first engaging notch 132, and said second engaging notch 153 can be decided according to stability, convenience in operation, or other requirements, which are not limited to the first preferred embodiment.

Figure 9:
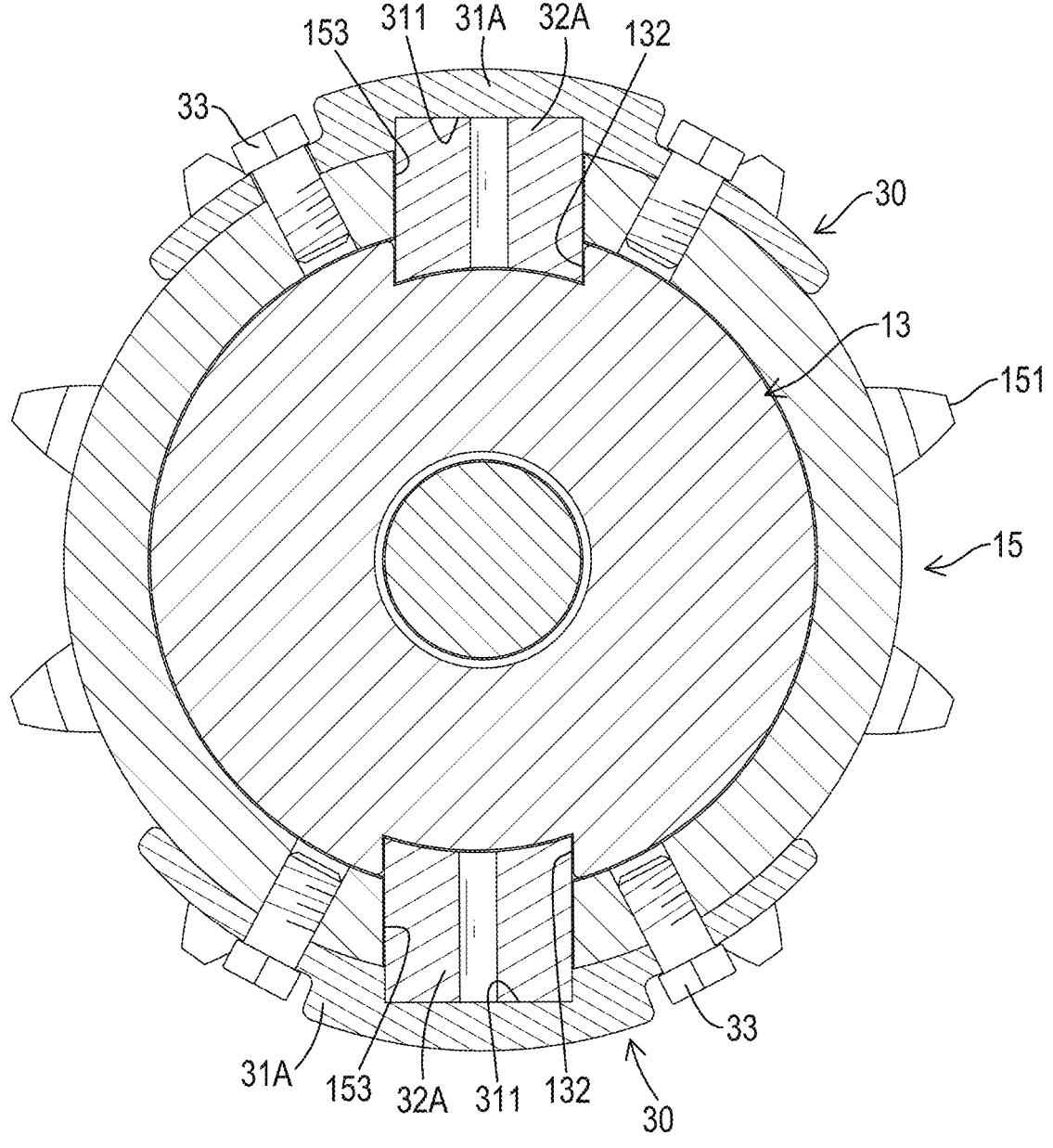
FIG. 9 is a sectional view of the adjusting switch of a second preferred embodiment of the adjustable freewheel hub assembly in accordance with the present invention.

With reference to FIG. 9, a second preferred embodiment of the adjustable freewheel hub assembly in accordance with the present invention differs from the first preferred embodiment in that: the fixing sheet 31A of each one of the two adjusting switches 30 has an aligning groove 311. When the fixing sheet 31A is attached to the periphery of the sprocket 15, the engaging block 32A is configured to be engaged in the aligning groove 311 so as to align each one of the through holes with a respective one of multiple threaded holes on the sprocket 15. Thereby, each bolt 33 can be mounted through the corresponding through hole on said fixing sheet 31A and screwed in the corresponding threaded hole on the sprocket 15 accurately.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An adjustable freewheel hub assembly comprising:
   a hub component having
      an axle;
      a hub shell surrounding the axle;
      a helix hub driver disposed on an end of the hub shell, sheathed onto the axle, and having at least one pawl groove and at least one first engaging notch formed on its periphery;
      a brake arm disposed on another end of the hub shell; and
      a sprocket sheathed onto the helix hub driver, being hollow, and having
         a ratchet teeth construction formed on an inner wall of the sprocket; and
         at least one second engaging notch;
   a coaster brake mechanism disposed in the hub shell and between the helix hub driver and the brake arm, sheathed onto the axle, and being drivable by the helix hub driver to abut against an inner wall of the hub shell; and
   at least one adjusting switch detachably engaged in the at least one first engaging notch and the at least one second engaging notch such that the helix hub driver and the sprocket rotate synchronously.

2. The adjustable freewheel hub assembly as claimed in claim 1, wherein each adjusting switch has
   an engaging block configured to be engaged in said at least one first engaging notch and said at least one second engaging notch at the same time; and
   a fixing sheet configured to be screwed onto a periphery of the sprocket to limit the engaging block inside the corresponding first engaging notch and the corresponding second engaging notch.

3. The adjustable freewheel hub assembly as claimed in claim 2, wherein
   the fixing sheet has an aligning groove; and
   the engaging block is configured to be engaged in the aligning groove so as to align each one of multiple through holes on the fixing sheet with a respective one of multiple threaded holes on the sprocket.

4. The adjustable freewheel hub assembly as claimed in claim 1, wherein
   the helix hub driver has a pawl contained in each pawl groove; and
   the ratchet teeth construction and the pawl in each pawl groove match each other to form a ratchet mechanism.

5. The adjustable freewheel hub assembly as claimed in claim 4, wherein the helix hub driver has
   an annular ditch annularly recessed on the periphery of the helix hub driver and passing through the at least one pawl groove; and
   a limiting ring disposed in the annular ditch and abutting the pawl in each pawl groove to position said pawl in the corresponding pawl groove.

6. The adjustable freewheel hub assembly as claimed in claim 1, wherein the hub component has a ball bearing sheathed onto the helix hub driver and engaged with an inner side of the sprocket.

7. The adjustable freewheel hub assembly as claimed in claim 6, wherein the hub component has a dust cap disposed aside the ball bearing and the sprocket to prevent dust from entering an interior of the ball bearing and the sprocket.

8. The adjustable freewheel hub assembly as claimed in claim 7, wherein the hub component has a locknut screwed on the axle and disposed aside the dust cap to position the dust cap.

9. The adjustable freewheel hub assembly as claimed in claim 1, wherein the coaster brake mechanism has a clutch cone screwed with the helix hub driver;

a brake cone fixedly sheathed onto the axle; and at least one brake shoe attached to a periphery of the clutch cone and a periphery of the brake cone; and the clutch cone is drivable by the helix hub driver to move relative to the axle and push the at least one brake shoe against the inner wall of the hub shell.

10. The adjustable freewheel hub assembly as claimed in claim 9, wherein the brake cone has at least one positioning groove formed on its periphery; and each brake shoe has a protrusion formed on an end of said brake shoe and configured to be engaged in said positioning groove.

11. The adjustable freewheel hub assembly as claimed in claim 9, wherein the coaster brake mechanism has a tab disposed inside the clutch cone;

a spring seat disposed on an end of the clutch cone; and a compression spring disposed between the tab and the spring seat; and the tab is configured to be pushed by the clutch cone to drive the spring seat to be combined with the brake cone so as to restrict the rotation of the clutch cone relative to the axle.

12. The adjustable freewheel hub assembly as claimed in claim 11, wherein the spring seat has multiple insertions;

the brake cone has multiple extending grooves; and the spring seat is drivable by the tab to allow each one of the multiple insertions to be inserted into a respective one of the multiple extending grooves.

* * * * *